United States Patent [19]

Norlander

[11] Patent Number: 5,076,510
[45] Date of Patent: Dec. 31, 1991

[54] AUTOMATICALLY RETRACTABLE THREAD BOBBIN

[76] Inventor: Norman E. Norlander, 12427 137th Ave. East, Puvallup, Wash. 98374

[21] Appl. No.: 516,277

[22] Filed: Apr. 30, 1990

[51] Int. Cl.⁵ .............................................. B65H 49/06
[52] U.S. Cl. ...................................... 242/107; 242/7.19
[58] Field of Search ................ 242/107, 7.19, 107.2, 242/107.6

[56] References Cited

U.S. PATENT DOCUMENTS

| | | | |
|---|---|---|---|
| 460,723 | 10/1891 | Eisenhart | 242/129.3 |
| 1,838,874 | 12/1931 | Serres | 242/7.19 |
| 2,220,878 | 11/1940 | Harvey | 242/140 |
| 2,338,353 | 1/1944 | Perkins | 242/140 |
| 4,096,010 | 6/1978 | Parham et al. | 242/157 R |
| 4,189,111 | 2/1980 | Doiron | 242/7.19 |
| 4,253,620 | 3/1981 | Takei et al. | 242/107 |
| 4,462,551 | 7/1984 | Bloch | 242/7.19 |

Primary Examiner—Daniel P. Stodola
Assistant Examiner—John Q. Nguyen
Attorney, Agent, or Firm—Keith D. Gehr

[57] ABSTRACT

A thread bobbin especially useful for tying artificial flies and the like. The bobbin has a rotatable spool mounted on an arbor. The arbor also supports a yoke that holds a thread delivery tube. An annular space is defined between the arbor and an inner surface of the spool. A coiled flat spring is contained within the annular space. The spring is free in the sense that neither end is fixed to any other structural portion except by friction. In the resting or neutral position one end of the spring engages the inner surface of the spool and the other surface of the arbor. When thread is withdrawn the spring grips both the spool and arbor and the spring is tensioned. After more than a predetermined length of thread has been removed the spring slips clutch-like against the inner surface of the drum to prevent overtensioning. When tension is removed from the withdrawn thread an amount of thread up to the predetermined length is automatically rewound. When rotated in the rewind direction from the resting position, the spring is allowed to slip against the arbor. This allows any excess thread to be rewound onto the spool by hand and prevents the spring from doubling back on itself.

5 Claims, 2 Drawing Sheets

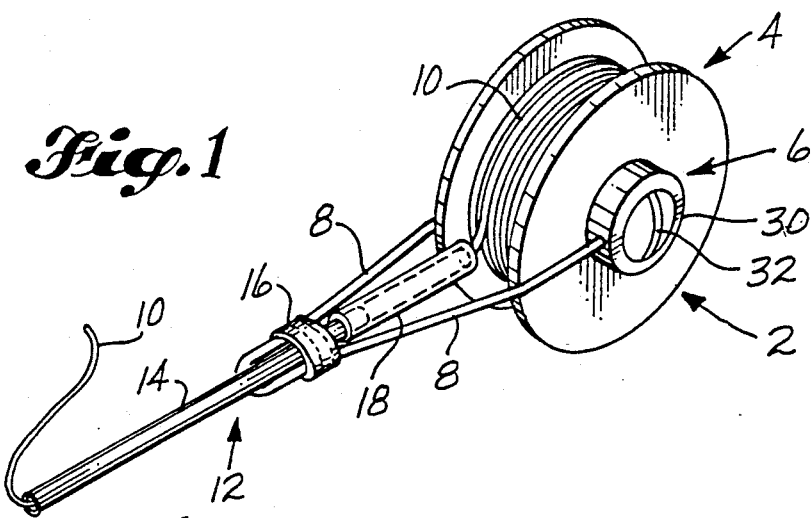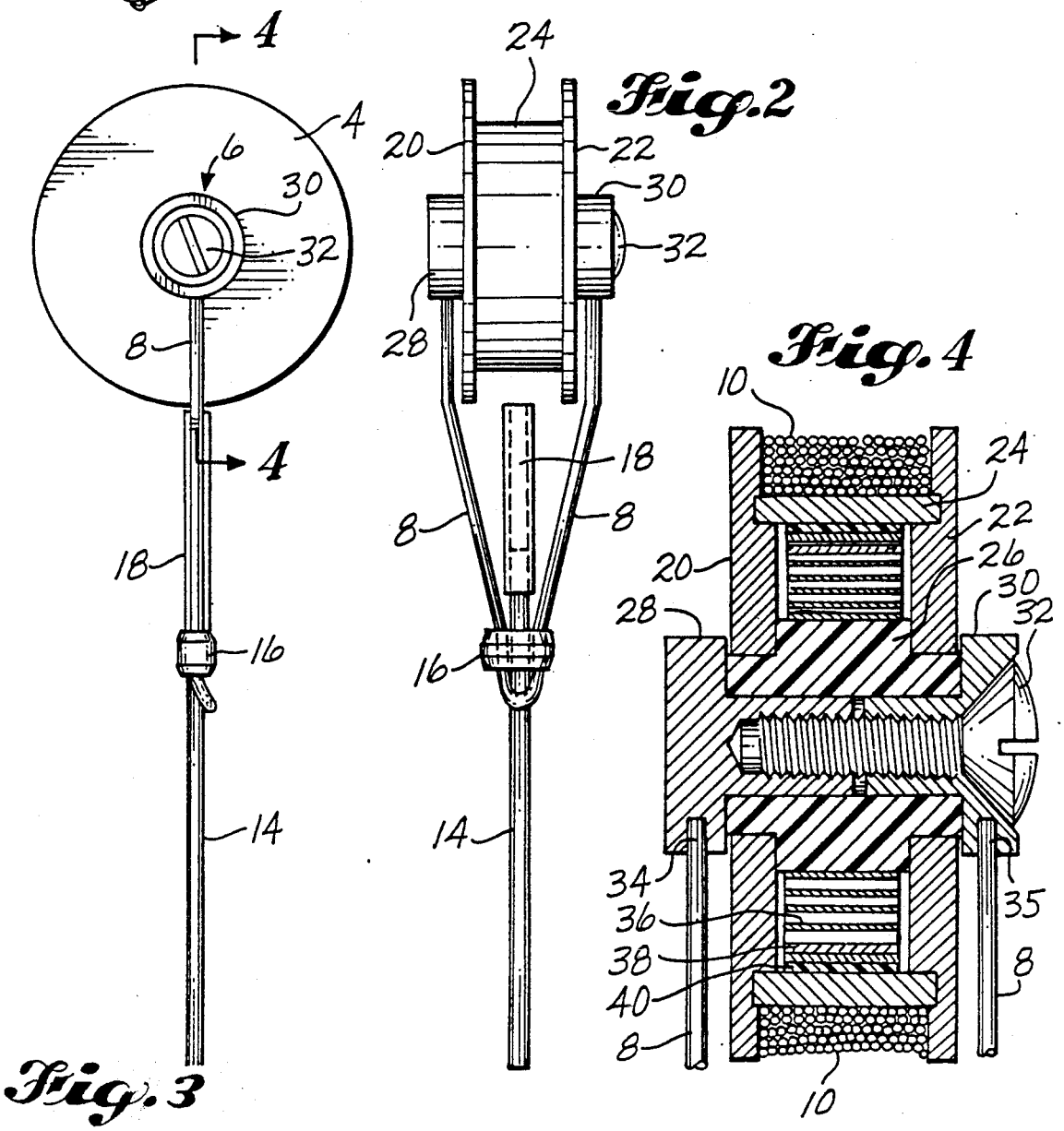

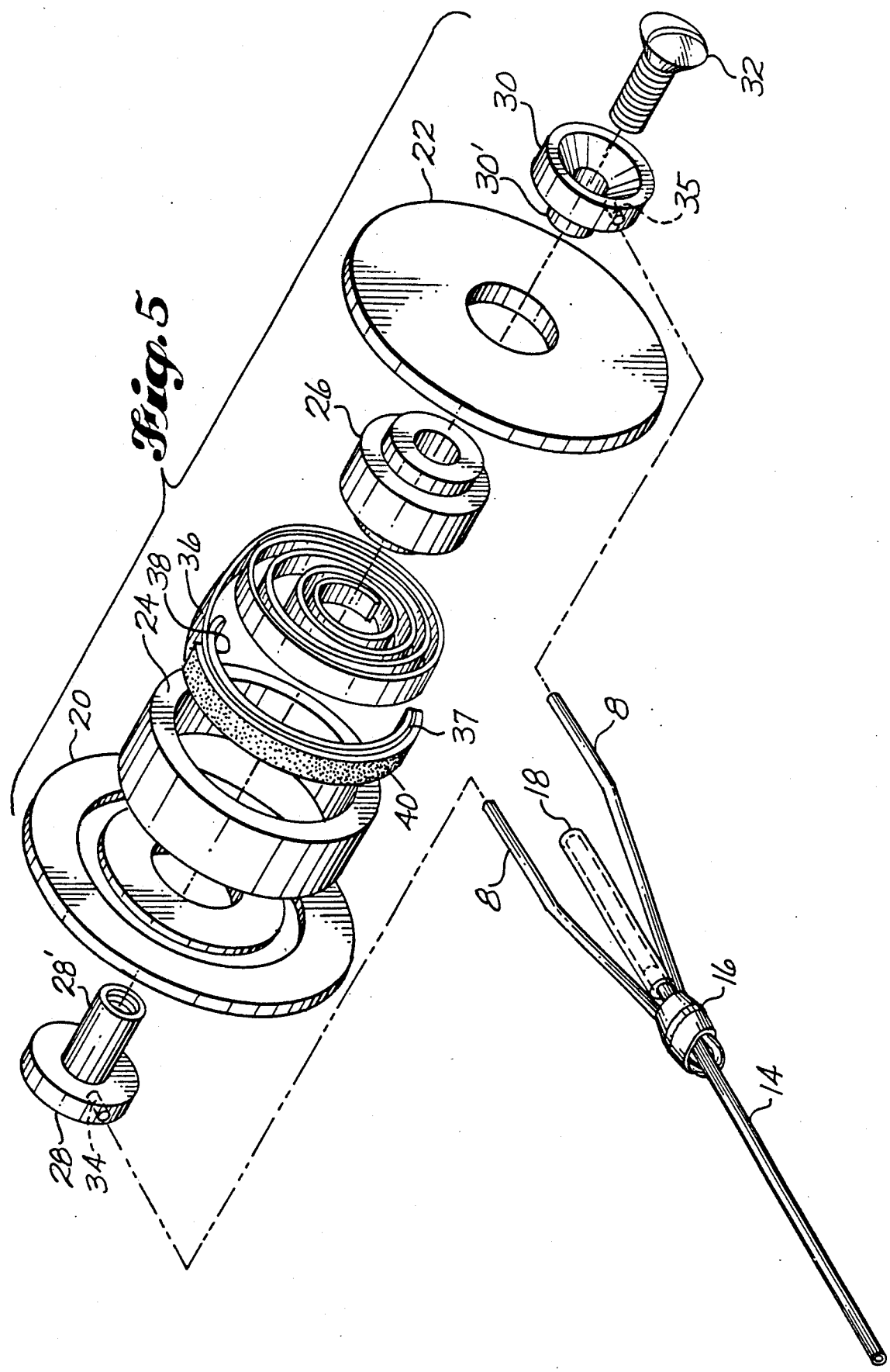

AUTOMATICALLY RETRACTABLE THREAD BOBBIN

BACKGROUND OF THE INVENTION

The present invention is a thread bobbin that can automatically rewind a predetermined length of thread but will permit any length of thread to be manually rewound. The bobbin is particularly useful for tying artifical flies for fishing lures.

Fly tying is a hobby for many fishermen that is second in enjoyment only to actually being out on a lake or stream. For others it is a means of earning a livelihood by tying flies professionally. Increasingly sophisticated equipment has become available over the years to enable flies of higher quality to be tied with greater ease. Much of this effort has gone into the design of better vises that hold the hook while the dressing is being applied. Surprisingly, relatively little thought seems to have gone into improving devices that hold the thread that much be applied to hold the dressing in place. Until recently, thread bobbins have been little more than crude handles on which a spool of thread is mounted.

Some attempts have been made in the past to develop improved bobbins. Among these can be mentioned U.S. Pat. Nos. 2,220,878 to Harvey and 2,338,353 to Perkins. Both of these are simple devices that do little more than guide the thread off the roll to the point of use. More recently Bloch, in U.S. Pat. No. 4,462,551, described a thread bobbin that was a major improvement over these earlier devices. The Bloch bobbin enabled a length of thread to be withdrawn and tied onto the fly. The bobbin could then hang freely by the thread without unwinding any further. When the fly was completed a given length of thread could be rewound automatically simply by lifting the bobbin to take the tension off the thread. However, the Bloch devices has the deficiency that any excess thread beyond that given length could not be rewound at all. The bobbin contains an internal spring that limited rewinding to only the predetermined length. This was both an inconvenience and a waste since any excess thread would often have to be clipped off and discarded.

Clutches operating against thread spools are known from the sewing and weaving arts. One example is shown in U.S. Pat. No. 460,723 to Eisenhart. However, devices of this type have little usefulness for the professional or recreational fly tier.

SUMMARY OF THE INVENTION

The present invention is a thread bobbin particularly useful for tying artifical flies and the like. The bobbin has a spool which comprises a thread drum with sidewalls. This drum has an outer surface, on which the thread is wound, and an inner surface. The spool is concentrically and rotatably mounted on an arbor in a manner so that an annular space exists between the arbor and inner surface of the drum. Apertures through the sidewalls serve as a bearing surface against the arbor. The sidewalls further define the annular space.

A free coiled flat spring is contained within the annular space inside the spool. The spring is free in the sense that neither end is fixed to any other structural portion except by friction. In the neutral or resting position, one end of the spring engages the arbor and the other end the inner surface of the drum. As thread is drawn from the drum the spring grips both the inner surface of the drum and the arbor and the spring is tensioned. However, after more than a predetermined length of thread is removed the spring slips clutch-like against the drum inner surface and is not tensioned further, even as more thread is withdrawn.

The tensioned spring serves to rewind the predetermined length of thread back onto the spool when tension on the thread is released. When this amount of thread is rewound the spring has returned to its resting or untensioned position.

A feature unique to the present invention allows any excess thread to be rewound onto the spool. In a device such as the one shown in U.S. Pat. No. 4,462,551, this is not possible because the spring, which is attached to the mandrel, would be doubled back upon itself and kinked or broken. In the present bobbin when the spool is rotated in the rewind direction from the resting position, the spring is allowed to slip against the arbor. This enables hand rewinding of any amount of excess thread without danger of damage to or interference from the spring.

The bobbin has another feature that greatly increase its ease of use. A problem with many fly tying bobbin arrangements is that of the thread slipping off the edge of the spool and winding around the shaft or pin on which the spool is mounted. Many of the bobbins available to the present have a thread tube through which the thread is fed as it is wound around the fly dressing. The entry point of this tube is some distance from the face of the spool itself. A thread tube is used on the present bobbin but it is extended almost to where it would touch the thread wound onto the spool. The thread tube is made in two parts. An outboard part is rigid and made in much the same manner as those in the past. However, this is completed by an inboard part of flexible or resilient tubing which extends adjacent the thread on the spool. This extension effectively prevents thread from slipping off the edge of the spool. By being made of a flexible material it can be easily displaced by finger pressure from its operating position to one where the thread can be easily fed into it.

In its preferred version the arbor on which the spool is mounted is operatively connected to a yoke that serves both as a frame or handle and as a mounting for the thread tube.

The bobbin can be made in a size and weight so that it can be suspended from the thread while in use without either rewinding or further unwinding. By simply raising the bobbin to take its weight off the thread can be rewound up to the predetermined length. Use of a flat spring ensures that an essentially constant tension will be placed on the string no matter how much is withdrawn.

It is an object of the present invention to provide a thread bobbin that can automatically rewind a predetermined length of thread and then permit any additional amount to be rewound by hand.

It is a further object to provide a thread bobbin that is particularly useful for tying artifical flies.

It is another object to provide a fly tying bobbin that simplifies and speeds the operations of fly tying.

These and many other objects will become readily apparent to those skilled in the art upon reading the following detailed description taken in conjunction with the drawings.

BRIEF DESCRIPTION OF THE DRAWINGS

FIG. 1 is a perspective view of the thread bobbin.

FIG. 2 is an edge elevation view.
FIG. 3 is a side elevation view.
FIG. 4 is a section through 4—4 of FIG. 3.
FIG. 5 is an exploded view of the thread bobbin

DETAILED DESCRIPTION OF THE PREFERRED EMBODIMENTS

The construction and operation of the bobbin can be readily understood by referring now to the drawings. In all figures like numbers represent like parts. Referring to FIGS. 1-3, the bobbin, generally indicated at 2, comprises a spool 4, a shaft assembly 6, a yoke 8, and a thread tube 12. Thread 10 is shown on the spool in position for use. The thread tube has an outboard portion 14, preferably a small diameter rigid metal tube, and a flexible inboard portion 18 which extends almost to the surface of the thread 10 on the spool. By maintaining the distance short between the end of the flexible portion 18 and the thread wound on the spool any tendency for thread to slip off the edge of the spool is virtually eliminated. The outboard portion 14 of the thread tube is mounted at the apex of the yoke at 16 by a crimped ferrule, soldering, or other conventional means.

Spool 4 is constructed with side plates 20, 22 and a thread drum 24. Most conveniently these are made as three separate parts with the drum inset into machined grooves in each sideplate. Alternatively, the drum can be made integral with either sideplate. Each side plate is centrally apertured to provide a bearing surface on which the drum can rotate about arbor 26. The arbor, in turn, is concentrically mounted on a hub/shaft assembly 28, 30. Normally the arbor would not rotate around shaft portions 28', 30' (FIG. 5). The hub assembly is unitized and tightened against the arbor with machine screw 32. Each hub portion is drilled radially at 34, 35 to hold the ends of yoke 8. The yoke is permanently fixed in these drill holes. In this manner the thread tube 12 is mounted normal to the axis of the spool.

Referring now to FIGS. 4 and 5, a flat spring 36 is coiled inside of the annular space between the arbor 26 and inner surface of drum 24. This spring is free; i.e., neither end is connected to any other structural portion except by friction. A somewhat heavier section of flat spring 38 is welded at 37 to the drum contacting end of flat spring 36. This serves to press it against the inner surface of drum 24. Optionally, a friction control material 40, such as a fluorocarbon tape, may be attached to the drum contacting surface of spring 36. The stiffer spring 38 should be somewhat shorter in length than one circumference of thread 24. Conveniently the longer flat spring 36 is made of spring steel 3/16" in width, 0.003" in thickness, and 36"-48" in length. Spring 38 is made of similar spring steel but is 0.005" in thickness and approximately 3" in length.

In operation, a predetermined length of thread 10 is drawn off the spool. At this time spring 36 is frictionally engaged both with the inner surface of drum 24 and the periphery of arbor 26. As thread continues to be withdrawn, the spring will tighten so that at some point it will begin to slip around the inner surface of the thread drum. By adjusting the system this can conveniently be made to occur when 16"-18" of thread has been withdrawn. This amount of thread can be rewound automatically by energy stored within the spring when tension on the thread is released. In the neutral position; i.e., the resting or untensioned position of the spring, thread can be manually rewound onto the spool. This is because in the rewind direction, when the spring is untensioned, the spring will slip around arbor 26. In this manner the spring will not be doubled back upon itself and broken.

It will be apparent to those skilled in the art that many variations can be made in the construction of the bobbin without changing its mode of operation. It is the inventor's intention that these should be considered within the scope of the invention if they are encompassed within the language of the following claims.

I claim:

1. A thread bobbin which comprises:
a spool further comprising a thread drum and sidewalls, the drum having an outer thread contacting surface and an inner spring contacting surface, the spool being concentrically and rotatably mounted on an arbor so as to create an annular space defined by the sidewalls, the arbor, and the drum inner surface;
an essentially untensioned free coiled flat spring contained within the annular space, one end of the spring frictionally gripping the arbor and the other end initially frictionally gripping the inner drum surface so that the spring is tensioned when the spool is rotated from a resting position in a first direction by drawing off thread from the spool, the spring acting as a clutch and slipping against the inner drum surface to prevent further spring tensioning after more than a predetermined length of thread has been drawn off the spool,
the tensioned spring serving to rewind the predetermined length of thread back onto the spool when tension on the thread is removed thus allowing the spool to return to its initial resting position and the spring to its initial essentially untensioned position,
the spring being further constructed to slip about the arbor when the spool is rotated from the untensioned position of the spring in a second direction in order to allow any excess thread to be manually rewound onto the spool without doubling the spring back on itself.

2. The thread bobbin of claim 1 which further comprises a yoke operatively connected to the arbor and acting as a frame, the yoke also holding a thread delivery tube situated normal to the axis of the spool.

3. The thread bobbin of claim 2 in which the thread tube has a rigid portion outboard the yoke and a flexible portion inboard the yoke, one end of the flexible portion extending generally radially adjacent the spool and serving to prevent thread from running off the edges of the spool and wrapping around the arbor, the flexible portion being deflectable with finger pressure to permit easy insertion of thread.

4. The thread bobbin of cliam 2 in which the arbor is concentrically mounted on a shaft and the yoke has end portions fixed in the shaft.

5. The thread bobbin of claim 1 in which the drum contacting portion of the spring is overlaid with a friction control material.

* * * * *